US012576520B2

(12) United States Patent
Narang et al.

(10) Patent No.: US 12,576,520 B2
(45) Date of Patent: Mar. 17, 2026

(54) TECHNIQUES FOR DEPLOYING TRAINED MACHINE LEARNING MODELS FOR ROBOT CONTROL

(71) Applicant: NVIDIA CORPORATION, Santa Clara, CA (US)

(72) Inventors: Yashraj Shyam Narang, Seattle, WA (US); Ankur Handa, Seattle, WA (US); Karl Van Wyk, Issaquah, WA (US); Dieter Fox, Seattle, WA (US); Michael Andres Lin, San Mateo, CA (US); Fabio Tozeto Ramos, Seattle, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 133 days.

(21) Appl. No.: 18/490,630

(22) Filed: Oct. 19, 2023

(65) Prior Publication Data

US 2024/0300100 A1 Sep. 12, 2024

Related U.S. Application Data

(60) Provisional application No. 63/488,667, filed on Mar. 6, 2023.

(51) Int. Cl.
B25J 9/16 (2006.01)

(52) U.S. Cl.
CPC ............. B25J 9/163 (2013.01); B25J 9/1605 (2013.01); B25J 9/1653 (2013.01); B25J 9/1664 (2013.01); B25J 9/1671 (2013.01); G05B 2219/40499 (2013.01)

(58) Field of Classification Search
CPC ........ B25J 9/163; B25J 9/1605; B25J 9/1653; B25J 9/1664; B25J 9/1671; G05B 2219/40499; G05B 2219/40032
See application file for complete search history.

(56) References Cited

U.S. PATENT DOCUMENTS

| | | |
|---|---|---|
| 10,556,336 B1 | 2/2020 | Bai |
| 10,800,040 B1 | 10/2020 | Beckman et al. |
| 11,213,946 B1 | 1/2022 | Bai et al. |
| 11,244,145 B2 | 2/2022 | Eshima et al. |
| 11,461,589 B1 | 10/2022 | Bai |
| 11,494,632 B1 | 11/2022 | Bai |
| 11,584,008 B1 * | 2/2023 | Beckman ............... B25J 9/1697 |
| 11,685,045 B1 * | 6/2023 | Herzog .................... B25J 9/161 |
| | | 700/250 |

(Continued)

OTHER PUBLICATIONS

Abeyruwan et al., "i-Sim2Real: Reinforcement Learning of Robotic Policies in Tight Human-Robot Interaction Loops", 6th Conference on Robot Learning, arXiv:2207.06572, Nov. 22, 2022, pp. 1-32.

(Continued)

*Primary Examiner* — Sohana Tanju Khayer
(74) *Attorney, Agent, or Firm* — Artegis Law Group, LLP

(57) ABSTRACT

One embodiment of a method for controlling a robot includes receiving sensor data indicating a state of the robot, generating an action based on the sensor data and a trained machine learning model, computing a target state of the robot based on the action and a previous target state of the robot, and causing the robot to move based on the target state of the robot.

17 Claims, 5 Drawing Sheets

(56) References Cited

U.S. PATENT DOCUMENTS

| 11,707,838 B1 * | 7/2023 | Vogelsong | B25J 9/1671 |
| | | | 700/246 |
| 11,735,309 B2 | 8/2023 | Purdie et al. | |
| 12,157,226 B2 | 12/2024 | Kranski et al. | |
| 12,168,296 B1 | 12/2024 | Bennice et al. | |
| 2004/0267404 A1 | 12/2004 | Danko | |
| 2016/0364880 A1 | 12/2016 | Barratt et al. | |
| 2020/0159648 A1 | 5/2020 | Ghare et al. | |
| 2020/0265302 A1 | 8/2020 | Sanyal et al. | |
| 2021/0187733 A1 * | 6/2021 | Lee | G06N 20/00 |
| 2021/0213973 A1 | 7/2021 | Pena et al. | |
| 2021/0358595 A1 | 11/2021 | Tamersoy et al. | |
| 2021/0390452 A1 | 12/2021 | Kohata et al. | |
| 2022/0105626 A1 * | 4/2022 | Luo | G05B 17/02 |
| 2022/0111517 A1 | 4/2022 | Bennice et al. | |
| 2022/0172107 A1 | 6/2022 | Butterfoss et al. | |
| 2022/0262100 A1 | 8/2022 | Chandler et al. | |
| 2022/0382246 A1 | 12/2022 | Heiden et al. | |
| 2023/0109398 A1 * | 4/2023 | Kranski | B25J 9/1615 |
| | | | 700/250 |
| 2023/0226696 A1 * | 7/2023 | Mandlekar | B25J 9/1682 |
| | | | 700/264 |
| 2023/0298263 A1 | 9/2023 | Yang et al. | |
| 2023/0410404 A1 | 12/2023 | Barsan et al. | |
| 2024/0253215 A1 * | 8/2024 | Bennice | B25J 9/1671 |
| 2024/0300096 A1 * | 9/2024 | Cherian | B25J 13/003 |
| 2025/0128419 A1 * | 4/2025 | Lai | B25J 9/1666 |

OTHER PUBLICATIONS

Akkaya et al., "Solving Rubik's Cube with A Robot Hand", arXiv:1910. 07113, Oct. 16, 2019, pp. 1-51.

Allshire et al., "Transferring Dexterous Manipulation from GPU Simulation to a Remote Real-World TriFinger", arXiv:2108.09779, Oct. 20, 2022, 8 pages.

Andrews et al., "Contact and Friction Simulation for Computer Graphics", SIGGRAPH Courses, https://doi.org/10.1145/3532720. 3535640, Aug. 7-11, 2022, pp. 1-172.

Andrychowicz et al., "Learning Dexterous In-Hand Manipulation", The International Journal of Robotics Research, DOI: 10.1177/ 0278364919887447, vol. 39, 2020, pp. 3-20.

Apolinarska et al., "Robotic Assembly of Timber Joints Using Reinforcement Learning", Automation in Construction, https://doi. org/10.1016/j.autcon.2021.103569, vol. 125, No. 103569, Feb. 27, 2021, pp. 1-8.

Beltran-Hernandez et al., "Variable Compliance Control for Robotic Peg-in-Hole Assembly: A Deep-Reinforcement-Learning Approach", Applied Sciences, doi: 10.3390/app10196923, vol. 10, No. 6923, Oct. 2, 2020, pp. 1-17.

Bengio et al., "Curriculum Learning", Proceedings of the 26th International Conference on Machine Learning, 2009, pp. 41-48.

Chen et al., "Visual Dexterity: In-hand Dexterous Manipulation from Depth", arXiv:2211.11744, Nov. 21, 2022, pp. 1-61.

Chen et al., "Midas: A Multi-Joint Robotics Simulator with Intersection-Free Frictional Contact", arXiv:2210.00130, Sep. 30, 2022, 6 pages.

Davchev et al., "Residual Learning from Demonstration: Adapting DMPs for Contact-rich Manipulation", arXiv:2008.07682, Sep. 14, 2021, 8 pages.

Drake, Samuel Hunt, "Using Compliance In Lieu of Sensory Feedback for Automatic Assembly", 1978, 173 pages.

Fan et al., "A Learning Framework for High Precision Industrial Assembly", International Conference on Robotics and Automation (ICRA), IEEE, May 20-24, 2019, pp. 811-817.

Ferguson et al., "Intersection-free Rigid Body Dynamics", ACM Transactions on Graphics, https://doi.org/10.1145/3450626. 3459802, vol. 40, No. 4, Article 183, Aug. 2021, pp. 183:1-183:16.

Fu et al., "Safely Learning Visuo-Tactile Feedback Policies in Real For Industrial Insertion", arXiv:2210.01340, Oct. 4, 2022, 7 pages.

Gaz et al., "Dynamic Identification of the Franka Emika Panda Robot With Retrieval of Feasible Parameters Using Penalty-Based Optimization", IEEE Robotics and Automation Letters, Doi 10.1109/ LRA.2019.2931248, vol. 4, No. 4, Oct. 2019, pp. 4147-4154.

Handa et al., "DeXtreme: Transfer of Agile In-hand Manipulation from Simulation to Reality", arXiv:2210.13702, Oct. 25, 2022, pp. 1-28.

He et al., "Mask R-CNN", IEEE International Conference on Computer Vision (ICCV), 2017, pp. 2961-2969.

Hebecker et al., "Towards Real-World Force-Sensitive Robotic Assembly through Deep Reinforcement Learning in Simulations", IEEE/ASME International Conference on Advanced Intelligent Mechatronics, 2021, pp. 1045-1051.

Hou et al., "Data-efficient Hierarchical Reinforcement Learning for Robotic Assembly Control Applications", IEEE Transactions on Industrial Electronics, DOI 10.1109/TIE.2020.3038072, 2020, 11 pages.

Huang et al., "Fast Peg-and-Hole Alignment Using Visual Compliance", International Conference on Intelligent Robots and Systems (IROS), Nov. 3-7, 2013, pp. 286-292.

Inoue et al., "Deep Reinforcement Learning for High Precision Assembly Tasks", International Conference on Intelligent Robots and Systems (IROS), Sep. 24-28, 2017, pp. 819-825.

Johannink et al., "Residual Reinforcement Learning for Robot Control", International Conference on Robotics and Automation (ICRA), May 20-24, 2019, pp. 6023-6029.

Kimble et al., "Benchmarking Protocols for Evaluating Small Parts Robotic Assembly Systems", IEEE Robotics and Automation Letters, vol. 5, No. 2, Apr. 2020, pp. 883-889.

Kimble et al., "Performance Measures to Benchmark the Grasping, Manipulation, and Assembly of Deformable Objects Typical to Manufacturing Applications", Frontiers in Robotics and AI, DOI 10.3389/frobt.2022.999348, Nov. 21, 2022, pp. 1-12.

Lambeta et al., "DIGIT: A Novel Design for a Low-Cost Compact High-Resolution Tactile Sensor With Application to In-Hand Manipulation", IEEE Robotics and Automation Letters, vol. 5, No. 3, Jul. 2020, pp. 3838-3845.

Lan et al., "Affine Body Dynamics: Fast, Stable and Intersection-free Simulation of Stiff Materials", arXiv:2201.10022, Jan. 31, 2022, pp. 1-14.

Lee et al., "Learning Quadrupedal Locomotion Over Challenging Terrain", Science Robotics, DOI: 10.1126/scirobotics.abc5986, vol. 5, Oct. 21, 2020, pp. 1-13.

Lee et al., "Guided Uncertainty-Aware Policy Optimization: Combining Learning and Model-Based Strategies for Sample-Efficient Policy Learning", IEEE International Conference on Robotics and Automation (ICRA), May 31-Aug. 31, 2020, pp. 7505-7512.

Lin et al., "Microsoft COCO: Common Objects in Context", arXiv:1405. 0312, May 1, 2014, pp. 1-14.

Lozano-Perez et al., "Automatic Synthesis of Fine-Motion Strategies for Robots", The International Journal of Robotics Research, vol. 3, No. 1, 1984, pp. 3-24.

Luo et al., "Reinforcement Learning on Variable Impedance Controller for High-Precision Robotic Assembly", International Conference on Robotics and Automation (ICRA), May 20-24, 2019, pp. 3080-3087.

Luo et al., "Robust Multi-Modal Policies for Industrial Assembly via Reinforcement Learning and Demonstrations: A Large-Scale Study", arXiv:2103.11512, Jul. 31, 2021, 10 pages.

Luo et al., "Dynamic Experience Replay", 3rd Conference on Robot Learning, 2019, pp. 1-10.

Luo et al., "A Learning Approach to Robot-Agnostic Force-Guided High Precision Assembly", arXiv:2010.08052, Aug. 2, 2021, 7 pages.

Macklin, Miles, "Nvidia Warp: A High-performance Python Framework for GPU Simulation and Graphics", Retrieved from https:// github.com/nvidia/warp, Mar. 2022, 9 pages.

Macklin et al., "Local Optimization for Robust Signed Distance Field Collision", Proceedings of the ACM on Computer Graphics and Interactive Techniques, https://doi.org/10.1145/3384538, vol. 3, No. 1, Article 8, May 2020, pp. 8:1-8:17.

Makoviichuk et al., "RL Games: A High performance RL Library", RL Implementations, https://github.com/Denys88/rl_games, May 2022, 18 pages.

(56)            References Cited

OTHER PUBLICATIONS

Makoviychuk et al., "Isaac Gym: High Performance GPU-Based Physics Simulation For Robot Learning", arXiv:2108.10470, Aug. 25, 2021, pp. 1-32.

Margolis et al., "Rapid Locomotion via Reinforcement Learning", arXiv:2205.02824, May 5, 2022, 12 pages.

Morgan et al., "Vision-driven Compliant Manipulation for Reliable, High-Precision Assembly Tasks" arXiv:2106.14070, Jun. 26, 2021, 13 pages.

Muratore et al., "Assessing Transferability from Simulation to Reality for Reinforcement Learning", IEEE Transactions on Pattern Analysis and Machine Intelligence, DOI 10.1109/TPAMI.2019. 2952353, Oct. 2, 2019, pp. 1-12.

Narang et al., "Factory: Fast Contact for Robotic Assembly", arXiv:2205.03532, May 7, 2022, 21 pages.

Peng et al., "Sim-to-Real Transfer of Robotic Control with Dynamics Randomization", IEEE International Conference on Robotics and Automation (ICRA), May 21-25, 2018, pp. 3803-3810.

Pinto et al., "Asymmetric Actor Critic for Image-Based Robot Learning", arXiv:1710.06542, Oct. 18, 2017, 8 pages.

Rudin et al., "Learning toWalk in Minutes Using Massively Parallel Deep Reinforcement Learning", 5th Conference on Robot Learning, 2021, pp. 1-10.

Schoettler et al., "Meta-Reinforcement Learning for Robotic Industrial Insertion Tasks", IEEE/RSJ International Conference on Intelligent Robots and Systems (IROS), DOI: 10.1109/IROS45743.2020. 9340848, Oct. 25-29, 2020, pp. 9728-9735.

Schulman et al., "Proximal Policy Optimization Algorithms", arXiv:1707.06347, Aug. 28, 2017, pp. 1-12.

Shao et al., "Learning to Scaffold the Development of Robotic Manipulation Skills", IEEE International Conference on Robotics and Automation (ICRA), May 31-Aug. 31, 2020, pp. 5671-5677.

Si et al., "Taxim: An Example-based Simulation Model for GelSight Tactile Sensors", arXiv:2109.04027, Dec. 14, 2021, 8 pages.

Son et al., "Sim-to-Real Transfer of Bolting Tasks with Tight Tolerance", IEEE/RSJ International Conference on Intelligent Robots and Systems (IROS), DOI: 10.1109/IROS45743.2020.9341644, Oct. 25-29, 2020, pp. 9056-9063.

Spector et al., "InsertionNet—A Scalable Solution for Insertion", IEEE Robotics and Automation Letters, 2021, pp. 2-9.

Spector et al., "Deep Reinforcement Learning for Contact-Rich Skills Using Compliant Movement Primitives", arXiv:2008.13223, Oct. 25, 2020, pp. 1-27.

Spector et al., "InsertionNet 2.0: Minimal Contact Multi-Step Insertion Using Multimodal Multiview Sensory Input", arXiv:2203. 01153, Mar. 2, 2022, 7 pages.

Tang et al., "Autonomous Alignment of Peg and Hole by Force/ Torque Measurement for Robotic Assembly", IEEE International Conference on Automation Science and Engineering (CASE), Aug. 21-24, 2016, pp. 162-167.

Thomas et al., "Learning Robotic Assembly from Cad", IEEE International Conference on Robotics and Automation (ICRA), May 21-25, 2018, pp. 3524-3531.

Tian et al., "Assemble Them All: Physics-Based Planning for Generalizable Assembly by Disassembly", ACM Transactions on Graphics, https://doi.org/10.1145/3550454.3555525, vol. 41, No. 6, Article 278, Dec. 2022, pp. 278:1-278:15.

Tsai et al., "A New Technique for Fully Autonomous and Efficient 3D Robotics Hand/Eye Calibration", IEEE Transactions on Robotics and Automation, vol. 5, No. 3, Jun. 1989, pp. 345-358.

Vecerik et al., "Leveraging Demonstrations for Deep Reinforcement Learning on Robotics Problems with Sparse Rewards", arXiv:1707. 08817, Oct. 8, 2018, pp. 1-10.

Vecerik et al., "A Practical Approach to Insertion with Variable Socket Position Using Deep Reinforcement Learning", International Conference on Robotics and Automation (ICRA), May 20-24, 2019, pp. 754-760.

Drigalski et al., "Robots Assembling Machines: Learning from the World Robot Summit 2018 Assembly Challenge", Advanced Robotics, arXiv:1911.05884, vol. 1, No. 1, Jan. 2020, pp. 1-18.

Vuong et al., "Learning Sequences of Manipulation Primitives for Robotic Assembly", arXiv:2011.00778, Mar. 26, 2021, 7 pages.

Wang et al., "TACTO: A Fast, Flexible, and Open-source Simulator for High-Resolution Vision-based Tactile Sensors", IEEE Robotics and Automation Letters, DOI: 10.1109/LRA.2022.3146945, Feb. 10, 2022, pp. 1-8.

Wen et al., "You Only Demonstrate Once: Category-Level Manipulation from Single Visual Demonstration", arXiv:2201.12716, May 6, 2022, 22 pages.

Whitney, D. E., "Quasi-Static Assembly of Compliantly Supported Rigid Parts", Journal of Dynamic Systems, Measurement, and Control, vol. 104, Mar. 1982, pp. 65-77.

Wu et al., "Learning Dense Rewards for Contact-Rich Manipulation Tasks", arXiv:2011.08458, Nov. 17, 2020, 8 pages.

Xia et al., "Dynamic Analysis for Peg-In-Hole Assembly With Contact Deformation", The International Journal of Advanced Manufacturing Technology, vol. 30, DOI 10.1007/s00170-005-0047-4, 2006, pp. 118-128.

Xu et al., "Efficient Tactile Simulation with Differentiability for Robotic Manipulation", 6th Conference on Robot Learning, 2022, pp. 1-11.

Xu et al., "Compare Contact Model-based Control and Contact Model-free Learning: A Survey of Robotic Peg-in-hole Assembly Strategies", IEEE, arXiv:1904.05240, Mar. 2019, pp. 1-15.

Yoon et al., "Fast and Accurate Data-Driven Simulation Framework for Contact-Intensive Tight-Tolerance Robotic Assembly Tasks", arXiv:2202.13098, Feb. 26, 2022, pp. 1-16.

Yuan et al., "GelSight: High-Resolution Robot Tactile Sensors for Estimating Geometry and Force", Sensors, vol. 17, No. 2762, doi:10.3390/s17122762, Nov. 29, 2017, pp. 1-21.

Zhang et al., "A Modular Robotic Arm Control Stack for Research: Franka-Interface and FrankaPy" arXiv:2011.02398, Nov. 4, 2020, pp. 1-7.

Zhang et al., "Learning Insertion Primitives with Discrete-Continuous Hybrid Action Space for Robotic Assembly Tasks", arXiv:2110.12618, Oct. 25, 2021, 7 pages.

Zhao et al., "Offline Meta-Reinforcement Learning for Industrial Insertion", arXiv:2110.04276, Sep. 1, 2022, 8 pages.

Lee et al., "Making sense of vision and touch: Learning multimodal representations for contact-rich tasks", arXiv:2305.17110v1, Jul. 28, 2019, 14 pages.

Non Final Office Action received for U.S. Appl. No. 18/489,789, dated Jun. 6, 2025, 46 pages.

Lee et al., "Online Continuous Mapping using Gaussian Process Implicit Surfaces", International Conference on Robotics and Automation, doi:10.1109/ICRA.2019.8794324, May 20-24, 2019, pp. 6884-6890.

Oliff et al., "Reinforcement Learning for Facilitating Human-Robot-Interaction in Manufacturing", Journal of Manufacturing Systems, vol. 56, https://doi.org/10.1016/j.jmsy.2020.06.018, Jul. 4, 2020, pp. 326-340.

Notice of Allowance received for U.S. Appl. No. 18/489,789, dated Oct. 16, 2025, 14 pages.

* cited by examiner

Sensor Data
304

Control Signal
306

Robot Control Application
146

Policy Model
152

PLAI Module
302

TECHNIQUES FOR DEPLOYING TRAINED MACHINE LEARNING MODELS FOR ROBOT CONTROL

CROSS-REFERENCE TO RELATED APPLICATIONS

This application claims priority benefit of the United States Provisional Patent Application titled, "TECHNIQUES FOR TRAINING AND IMPLEMENTING REINFORCEMENT LEARNING POLICIES FOR SIMULATED ROBOTS," filed on Mar. 6, 2023, and having Ser. No. 63/488,667. The subject matter of this related application is hereby incorporated herein by reference.

BACKGROUND

Technical Field

Embodiments of the present disclosure relate generally to computer science, artificial intelligence, and robotics and, more specifically, to techniques for deploying trained machine learning models for robot control.

Description of the Related Art

Robots are being increasingly used to perform tasks automatically or autonomously in various environments. For example, in a factory setting, robots are oftentimes used to perform the task of assembling objects together. One approach for controlling a robot is to first train a machine learning model with respect to a given task and then use the trained machine learning model to control the robot to perform the given task in a particular environment.

Some conventional techniques for training a machine learning model to control a robot use training data that is generated via a physical robot that performs a task in a real-world environment. These types of approaches are also referred to as "real-world" training. One drawback of real-world training is that this type of training can cause damage, including wear and tear, to the robot that performs the task in the real-world environment and to objects with which the robot interacts during the data generating process.

In order to avoid damaging a robot and other objects by training the robot using real-world training, a machine learning model can instead be trained using training data that is generated via simulations of a robot performing a task in a virtual environment. After the machine learning model has been trained to control the robot to perform a given task using training data that is generated via simulations, the trained machine learning model can be deployed to control a physical robot to perform that same task in a real-world environment. During the deployment, the machine learning model generates, at each of a number of time steps, an action that is composed with a current state of the robot, which is then transmitted to a robot controller that controls the physical robot to move according to the action composed with the current state.

One drawback of controlling a physical robot to perform a task in a real-world environment using a machine learning model that has been trained using training data that is generated via simulations is the simulations oftentimes do not accurately account for all of the physical phenomena that exist or can occur in the real-world environment. For example, the friction between the different joints of a physical robot could be unknown and, therefore, not accurately modeled or accounted for during the simulations. As another example, gravity compensation, in which torques are applied to the joints of a physical robot to balance out the torques on those joints resulting from the weight of the robot, could be simulated during the simulations in a different manner than gravity compensation is applied to the physical robot in a real-world environment. When a physical robot is controlled using a machine learning model that has been trained using simulations that do not accurately account for the physical phenomena in a real-world environment, the physical robot may be unable to correctly perform a task for which the machine learning model was trained.

As the foregoing illustrates, what is needed in the art are more effective techniques for controlling robots to perform tasks in real-world environments.

SUMMARY

One embodiment of the present disclosure sets forth a computer-implemented method for controlling a robot. The method includes receiving sensor data indicating a state of the robot. The method further includes generating an action based on the sensor data and a trained machine learning model. The method also includes computing a target state of the robot based on the action and a previous target state of the robot. In addition, the method includes causing the robot to move based on the target state of the robot.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that the disclosed techniques permit physical robots to be more effectively controlled using trained machine learning models than what can be achieved using prior art approaches. With the disclosed techniques, a physical robot can be controlled using a trained machine learning model to correctly perform a task in a real-world environment, even if the machine learning model was trained using simulations that do not accurately account for all of the physical phenomena in the real-world environment. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide techniques for controlling a robot using a trained machine learning model. In some embodiments, a robot control application receives sensor data that indicates a current state of the robot. The robot control application inputs the sensor data into a trained machine learning model that generates an action. The robot control application adds the action to a target state of the robot, which is computed as the sum of an initial state of the robot and actions generated at each time step when the robot is being controlled. Then, the robot control application determines whether a difference between the target state of the robot and the current state of the robot is greater than a threshold amount. If the difference between the target state of the robot and the current state of the robot is greater than the threshold amount, then the robot control application clamps the difference between the target state of the robot and the current state of the robot to the threshold amount and generates a new target state by adding the clamped difference to the previous target state. Thereafter, the robot control application causes the robot to move based on the target state.

The techniques for using trained machine learning models to control robots to perform tasks have many real-world applications. For example, those techniques could be used to control a robot to grasp and manipulate an object, such as picking up the object, placing the object, and/or inserting the object into another object. As a further example, those techniques could be used to control a robot to assemble objects together.

The above examples are not in any way intended to be limiting. As persons skilled in the art will appreciate, as a general matter, the techniques for controlling robots described herein can be implemented in any suitable application.

System Overview

Figure 1:
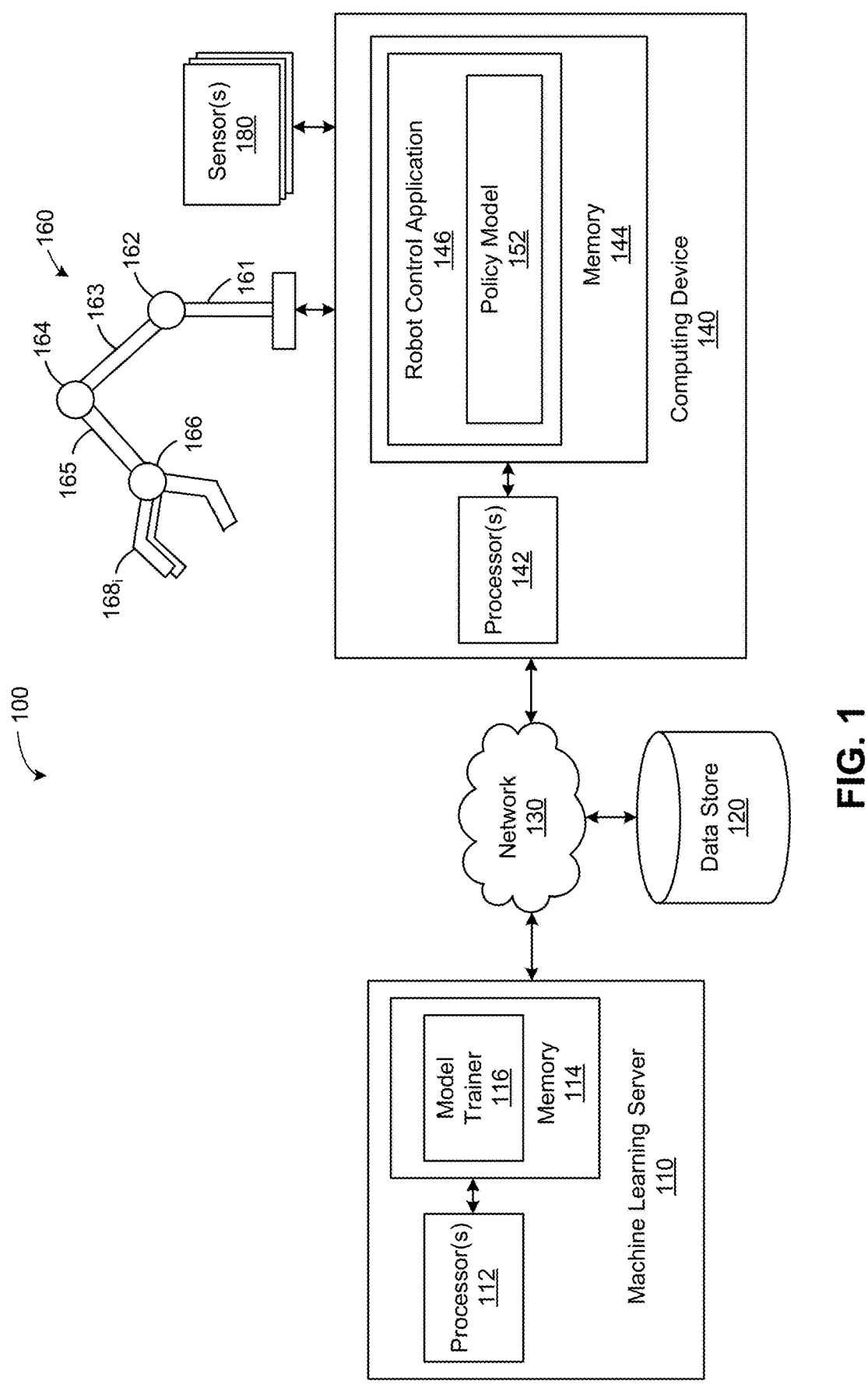
FIG. 1 illustrates a block diagram of a computer-based system configured to implement one or more aspects of the various embodiments.

FIG. 1 illustrates a block diagram of a computer-based system 100 configured to implement one or more aspects of at least one embodiment. As shown, the system 100 includes a machine learning server 110, a data store 120, and a computing device 140 in communication over a network 130, which can be a wide area network (WAN) such as the Internet, a local area network (LAN), a cellular network, and/or any other suitable network.

As shown, a model trainer 116 executes on one or more processors 112 of the machine learning server 110 and is stored in a system memory 114 of the machine learning server 110. The processor 112 receives user input from input devices, such as a keyboard or a mouse. In operation, the one or more processors 112 may include one or more primary processors of the machine learning server 110, controlling and coordinating operations of other system components. In particular, the processor(s) 112 can issue commands that control the operation of one or more graphics processing units (GPUs) (not shown) and/or other parallel processing circuitry (e.g., parallel processing units, deep learning accelerators, etc.) that incorporates circuitry optimized for graphics and video processing, including, for example, video output circuitry. The GPU(s) can deliver pixels to a display device that can be any conventional cathode ray tube, liquid crystal display, light-emitting diode display, and/or the like.

The system memory 114 of the machine learning server 110 stores content, such as software applications and data, for use by the processor(s) 112 and the GPU(s) and/or other processing units. The system memory 114 can be any type of memory capable of storing data and software applications, such as a random-access memory (RAM), a read-only memory (ROM), an erasable programmable read-only memory (EPROM or Flash ROM), or any suitable combination of the foregoing. In some embodiments, a storage (not shown) can supplement or replace the system memory 114. The storage can include any number and type of external memories that are accessible to the processor 112 and/or the GPU. For example, and without limitation, the storage can include a Secure Digital Card, an external Flash memory, a portable compact disc read-only memory (CD-ROM), an optical storage device, a magnetic storage device, and/or any suitable combination of the foregoing.

The machine learning server 110 shown herein is for illustrative purposes only, and variations and modifications are possible without departing from the scope of the present disclosure. For example, the number of processors 112, the number of GPUs and/or other processing unit types, the number of system memories 114, and/or the number of applications included in the system memory 114 can be modified as desired. Further, the connection topology between the various units in FIG. 1 can be modified as desired. In some embodiments, any combination of the processor(s) 112, the system memory 114, and/or GPU(s) can be included in and/or replaced with any type of virtual computing system, distributed computing system, and/or cloud computing environment, such as a public, private, or a hybrid cloud system.

In some embodiments, the model trainer 116 is configured to train one or more machine learning models, including a policy model 152 that is trained to control a robot to perform a task. The policy model 152 can be trained in any technically feasible manner by the model trainer 116. In some embodiments, the policy model 152 can be trained using training data that is generated via simulations of the robot performing the task in a virtual environment. In some other embodiments, the policy model 152 can be trained using supervised learning in which the training data is from human demonstrations of controlling the robot to perform the task. Training data and/or trained machine learning models, including the policy model 152, can be stored in the data store 120. In some embodiments, the data store 120 can include any storage device or devices, such as fixed disc drive(s), flash drive(s), optical storage, network attached storage (NAS), and/or a storage area-network (SAN).

Although shown as accessible over the network 130, in at least one embodiment the machine learning server 110 can include the data store 120.

As shown, a robot control application 146 that uses the policy model 152 is stored in a system memory 144, and executes on a processor 142, of the computing device 140. Once trained, the policy model 152 can be deployed in any suitable manner, such as in robot control application 146. Illustratively, given sensor data captured by one or more sensors 180 (e.g., robot encoder readings indicating the joint angles of a robot), the policy model 152 can be used to control a physical robot 160 to perform a task, for which the policy model 152 was trained, in a real-world environment.

As shown, the robot 160 includes multiple links 161, 163, and 165 that are rigid members, as well as joints 162, 164, and 166 that are movable components that can be actuated to cause relative motion between adjacent links. In addition, the robot 160 includes multiple fingers 168$_i$ (referred to herein collectively as fingers 168 and individually as a finger 168) that can be controlled to grip an object. For example, in some embodiments, the robot 160 may include a locked wrist and multiple (e.g., four) fingers. Although an example robot 160 is shown for illustrative purposes, in some embodiments, techniques disclosed herein can be applied to control any suitable robot.

Figure 2:
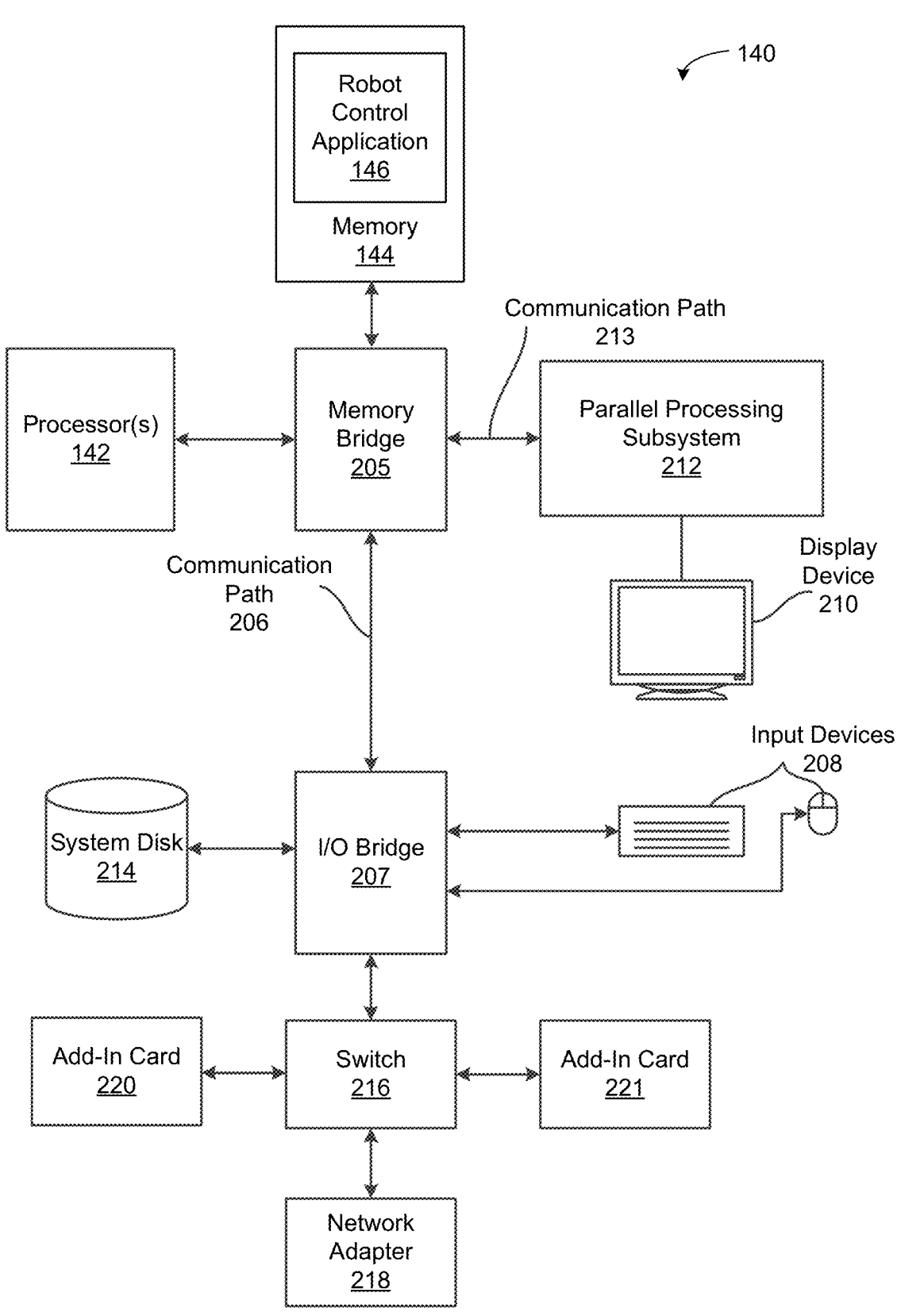
FIG. 2 is a more detailed illustration of the computing device FIG. 1, according to various embodiments.

FIG. 2 is a block diagram illustrating the computing device 140 of FIG. 1 in greater detail, according to various embodiments. The computing device 140 may include any type of computing system, including, without limitation, a server machine, a server platform, a desktop machine, a laptop machine, a hand-held/mobile device, a digital kiosk, an in-vehicle infotainment system, and/or a wearable device. In some embodiments, the computing device 140 is a server machine operating in a data center or a cloud computing environment that provides scalable computing resources as a service over a network. In some embodiments, the machine learning server 110 can include one or more similar components as the computing device 140.

In various embodiments, the computing device 140 includes, without limitation, the processor(s) 142 and the memory(ies) 144 coupled to a parallel processing subsystem 212 via a memory bridge 205 and a communication path 213. Memory bridge 205 is further coupled to an I/O (input/output) bridge 207 via a communication path 206, and I/O bridge 207 is, in turn, coupled to a switch 216.

In one embodiment, I/O bridge 207 is configured to receive user input information from optional input devices 208, such as a keyboard, mouse, touch screen, sensor data analysis (e.g., evaluating gestures, speech, or other information about one or more uses in a field of view or sensory field of one or more sensors), and/or the like, and forward the input information to the processor(s) 142 for processing. In some embodiments, the computing device 140 may be a server machine in a cloud computing environment. In such embodiments, computing device 140 may not include input devices 208, but may receive equivalent input information by receiving commands (e.g., responsive to one or more inputs from a remote computing device) in the form of messages transmitted over a network and received via the network adapter 218. In some embodiments, switch 216 is configured to provide connections between I/O bridge 207 and other components of the computing device 140, such as a network adapter 218 and various add-in cards 220 and 221.

In some embodiments, I/O bridge 207 is coupled to a system disk 214 that may be configured to store content and applications and data for use by processor(s) 142 and parallel processing subsystem 212. In one embodiment, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high-definition DVD), or other magnetic, optical, or solid state storage devices. In various embodiments, other components, such as universal serial bus or other port connections, compact disc drives, digital versatile disc drives, film recording devices, and the like, may be connected to I/O bridge 207 as well.

In various embodiments, memory bridge 205 may be a Northbridge chip, and I/O bridge 207 may be a Southbridge chip. In addition, communication paths 206 and 213, as well as other communication paths within computing device 140, may be implemented using any technically suitable protocols, including, without limitation, AGP (Accelerated Graphics Port), HyperTransport, or any other bus or point-to-point communication protocol known in the art.

In some embodiments, parallel processing subsystem 212 comprises a graphics subsystem that delivers pixels to an optional display device 210 that may be any conventional cathode ray tube, liquid crystal display, light-emitting diode display, and/or the like. In such embodiments, the parallel processing subsystem 212 may incorporate circuitry optimized for graphics and video processing, including, for example, video output circuitry. Such circuitry may be incorporated across one or more parallel processing units (PPUs), also referred to herein as parallel processors, included within the parallel processing subsystem 212.

In some embodiments, the parallel processing subsystem 212 incorporates circuitry optimized (e.g., that undergoes optimization) for general purpose and/or compute processing. Again, such circuitry may be incorporated across one or more PPUs included within parallel processing subsystem 212 that are configured to perform such general purpose and/or compute operations. In yet other embodiments, the one or more PPUs included within parallel processing subsystem 212 may be configured to perform graphics processing, general purpose processing, and/or compute processing operations. System memory 144 includes at least one device driver configured to manage the processing operations of the one or more PPUs within parallel processing subsystem 212. In addition, the system memory 144 includes the robot control application 146. Although described herein primarily with respect to the robot control application 146, techniques disclosed herein can also be implemented, either entirely or in part, in other software and/or hardware, such as in the parallel processing subsystem 212.

In various embodiments, parallel processing subsystem 212 may be integrated with one or more of the other elements of FIG. 2 to form a single system. For example, parallel processing subsystem 212 may be integrated with processor 142 and other connection circuitry on a single chip to form a system on a chip (SoC).

In some embodiments, processor(s) 142 includes the primary processor of computing device 140, controlling and coordinating operations of other system components. In some embodiments, the processor(s) 142 issues commands that control the operation of PPUs. In some embodiments, communication path 213 is a PCI Express link, in which dedicated lanes are allocated to each PPU. Other communication paths may also be used. The PPU advantageously implements a highly parallel processing architecture, and the PPU may be provided with any amount of local parallel processing memory (PP memory).

It will be appreciated that the system shown herein is illustrative and that variations and modifications are possible. The connection topology, including the number and arrangement of bridges, the number of CPUs 202, and the number of parallel processing subsystems 212, may be modified as desired. For example, in some embodiments, system memory 144 could be connected to the processor(s) 142 directly rather than through memory bridge 205, and other devices may communicate with system memory 144 via memory bridge 205 and processor 142. In other embodiments, parallel processing subsystem 212 may be connected to I/O bridge 207 or directly to processor 142, rather than to memory bridge 205. In still other embodiments, I/O bridge 207 and memory bridge 205 may be integrated into a single chip instead of existing as one or more discrete devices. In certain embodiments, one or more components shown in FIG. 2 may not be present. For example, switch 216 could be eliminated, and network adapter 218 and add-in cards 220, 221 would connect directly to I/O bridge 207. Lastly, in certain embodiments, one or more components shown in FIG. 2 may be implemented as virtualized resources in a virtual computing environment, such as a cloud computing environment. In particular, the parallel processing subsystem 212 may be implemented as a virtualized parallel processing subsystem in at least one embodiment. For example, the parallel processing subsystem 212 may be implemented as a virtual graphics processing unit(s) (vGPU(s)) that renders graphics on a virtual machine(s) (VM(s)) executing on a server machine(s) whose GPU(s) and other physical resources are shared across one or more VMs.

Deploying Trained Machine Learning Models for Robot Control

Figure 3:
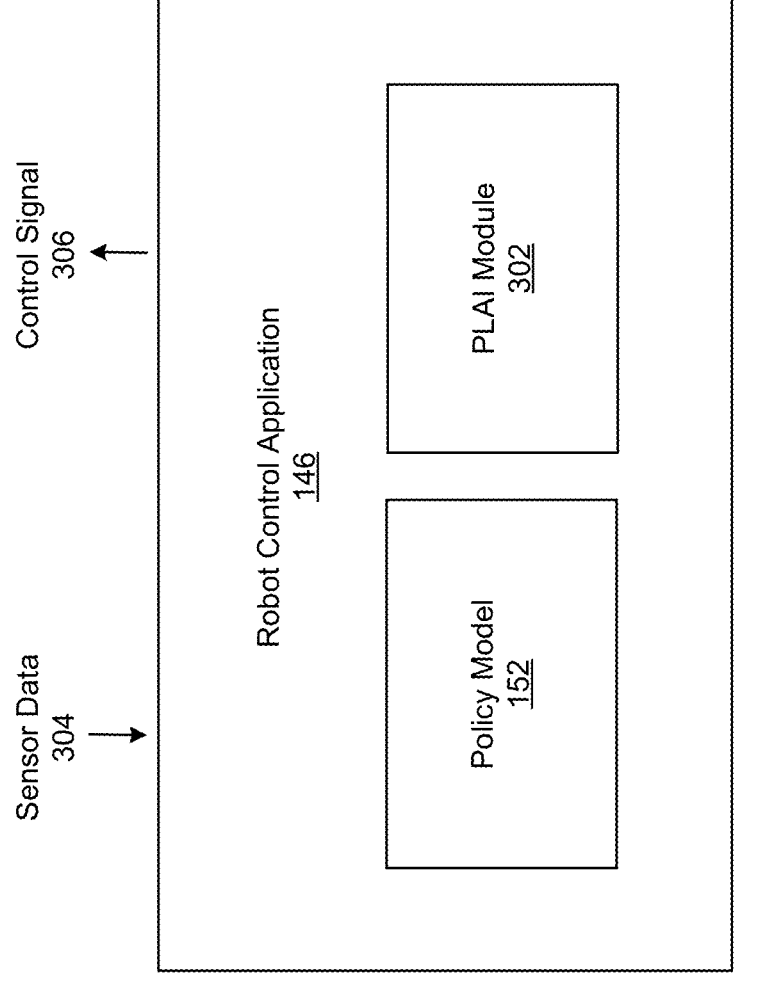
FIG. 3 is a more detailed illustration of the robot control application of FIG. 1, according to various embodiments.

FIG. 3 is a more detailed illustration of the robot control application 146 of FIG. 1, according to various embodiments. As shown, the robot control application 146 includes the policy model 152 and a Policy-Level Action Integrator (PLAI) module 302. In operation, the robot control application 146 receives sensor data 304 from the sensor(s) 180 and generates a control signal 306 that is used to control the robot 160 to move. Any technically feasible sensor data 304 that indicates a current state of the robot 160 can be received. For example, in some embodiments, the sensor data 304 can include proprioception data indicating the current angles of joints of the robot 160, such as robot joint encoder readings. Any technically feasible control signal 306 can be generated. For example, in some embodiments, the control signal 306 can indicate a target state of the robot 160. The target state is a desired state that the robot 160 should achieve. The control signal indicating the target state of the robot 160 can be transmitted to a robot controller that converts the target state into joint torques that are applied to joints of the robot 160.

The PLAI module 302 integrates (i.e., adds up) actions generated by the policy model 152 (also referred to herein as "policy actions") at different time steps when the robot 160 is being controlled. In some embodiments, at each time step, the PLAI module 302 inputs sensor data (i.e., the sensor data 304) that indicates a current state of the robot 160 into the policy model 152, which generates an action. In such cases, the policy model 152 can be a machine learning model that has been trained to control the robot 160 to perform a task. Further, the policy model 152 can take as input sensor data indicating a current state of the robot 160 and output an action. The policy model 152 can output any technically feasible action in some embodiments. Examples of actions that can be used in some embodiments include a pose change (i.e., a delta pose that includes a position increment and an orientation increment) of an end effector of the robot 160, a change in a robot joint space, a change in a learned space, etc.

The PLAI module 302 composes the action generated by the policy model 152 at the time step with a target state of the robot 160 to generate an updated target state. In some embodiments, the target state can be computed as the sum of an initial state of the robot 160 and actions generated at each time step when the robot is being controlled. That is, the target state of the robot 160 is the sum of the initial state of the robot 160 and the actions generated over time. Experience has shown that computing such a target state can minimize errors between a final state of the robot 160 and the target final state, even in the presence of physical complexities in the real-world environment that were not accurately simulated when generating training data to train the policy model 152.

It should be noted that the target state generated by the PLAI module 302 is used as a control setpoint, whereas in control proportional-integral (PI) controllers, an integral term is directly converted into control effort. More extensively, the PLAI module 302 integrates policy actions over multiple time steps to generate a setpoint, which can be used by a low-level controller, such as a low-level impedance controller, to attract the real state of the robot 160 towards the target state. Accordingly, if the system is disturbed from its current state (e, the robot 160 is pushed away), then the setpoint will not change instantaneously. Instead, the force vector will pull the system towards the same setpoint. By contrast, conventional PI integrates policy actions (in this case, equal to the control error) to generate a corrective force vector. Accordingly, if the system is distributed from its current state, then the accumulated error will be applied to an unintended state and may become a disturbance to the policy.

After composing the action with the target state of the robot 160 to generate the updated target state, the PLAI module 302 determines whether a difference between the updated target state of the robot and a current state of the robot is greater than a threshold amount. If the difference between the updated target state of the robot 160 and the current state of the robot 160 along any axis is greater than the threshold amount, then the PLAI module 302 clamps the difference between the updated target state of the robot 160 and the current state of the robot 160 along such ax(es) to the threshold amount. Then, the PLAI module 302 adds the clamped difference (i.e., the threshold amount) to the previous target state to generate an updated target state. Clamping the difference between the updated target state of the robot 160 and the current state of the robot 160 along the ax(es) to the threshold amount ensures that the difference does not become excessive, which can result in excessive torques being applied to joints of the robot 160.

Thereafter, the PLAI module 302 generates the control signal 306 using the updated target state of the robot. In some embodiments, the control signal 306 can be a signal that is transmitted to a robot controller, which in turn converts the updated target state into joint torques that are applied to joints of the robot 160. For example, in some embodiments, the robot controller can be a task space impedance controller, such as a proportional derivative (PD) controller.

More formally, the conventional approach for applying policy actions is $$s_{t+1}^d = s_t \oplus a_t = s_t \oplus \Pi(o_t), \tag{1}$$

where $s_{t+1}^d$ is the target state, $a_t$ is an action expressed as an incremental state target, $s_t$ is the current state, $o_t$ is the current observation, $\Pi$ is the policy, and $\oplus$ computes the state update (e.g., for states defined by position and orientation, $\oplus$ computes composition with a translation and rotation).

By contrast, the PLAI module 302 applies policy actions as $$s_{t+1}^d = s_t^d \oplus a_t = s_t^d \oplus \Pi(o_t). \tag{2}$$

Accordingly, the policy action is applied to the last target state instead of the current state. Unrolling from t=0 . . . T, $$s_T^d = s_0^d \oplus \sum_{i=0}^{T-1} a_i = s_0^d \oplus \sum_{i=0}^{T-1} \Pi(o_i). \tag{3}$$

where $s_0^d$ is set to $s_0^3$. Accordingly, the target state at time T is equal to the initial state composed with successive actions over time, effectively integrating them. Experience has shown that the computation of equation (3) requires relatively little implementation effort (i.e., 1-2 lines of code), is simple to tune, and outperforms conventional proportional-integral-derivative (PID) controllers when used to control a robot with a trained machine learning model.

In addition, the target state of equation (3) can be clamped along different axes as follows. $s_{t+1}^d$ can be rewritten as $$s_{t+1}^d = s_t \oplus \left( s_{t+1}^d \ominus s_t \right), \tag{4}$$

and the target state can be updated as $$s_{t+1}^d \leftarrow s_t \oplus \min\left( \left( s_{t+1}^d \ominus s_t \right), \epsilon \right), \tag{5}$$

where $\epsilon$ is a threshold transformation.

Figure 4A:
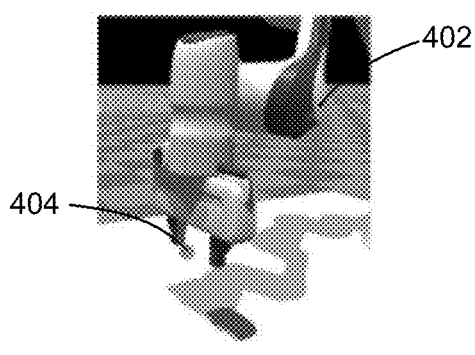
FIGS. 4A-4B illustrate an exemplar task being performed by a robot that is controlled using a trained machine learning model, according to the prior art.
Figure 4B:
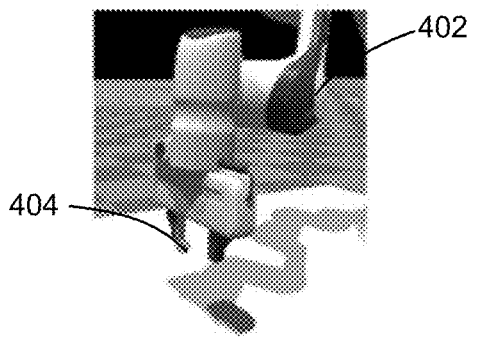

FIGS. 4A-4B illustrate an exemplar task being performed by a robot that is controlled using a trained machine learning model, according to the prior art. As shown in FIG. 4A, when a robot 402 is controlled using the conventional technique of moving the robot 402 according to outputs of a trained machine learning model, the robot 402 does not correctly perform the task of moving the fingertips of the robot 402 to a desired position 404 that should be at the center of the fingertips of the robot 402.

As shown in FIG. 4B, when the robot 402 is controlled using the outputs of a trained machine learning model and a PID controller, the robot 402 also does not correctly perform the task of moving the fingertips of the robot 402 to the desired position 404 that should be at the center of the fingertips of the robot 402.

Figure 4C:
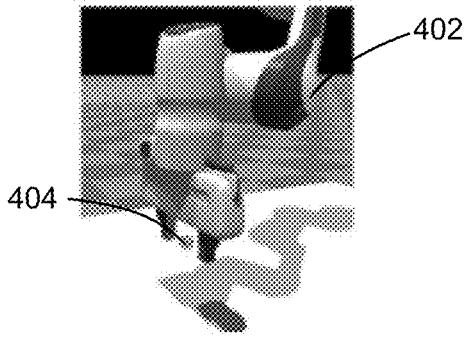
FIG. 4C illustrates an exemplar task being performed by a robot that is controlled using a trained machine learning model, according to various embodiments.

FIG. 4C illustrates an exemplar task being performed by a robot that is controlled using a trained machine learning model, according to various embodiments. As shown, when the robot 402 is controlled to follow a target state that is computed as the composition of an initial state of the robot 402 and actions generated at each time step when the robot 402 is being controlled, and the difference between the target state and a current state of the robot 402 along different axes, which can be translational and/or rotational axes, are clamped to a threshold amount, as described above in conjunction with FIG. 3, the robot 402 correctly performs the task of moving the fingertips of the robot 402 to the desired position 404 that should be at the center of the fingertips of the robot 402.

Figure 5:
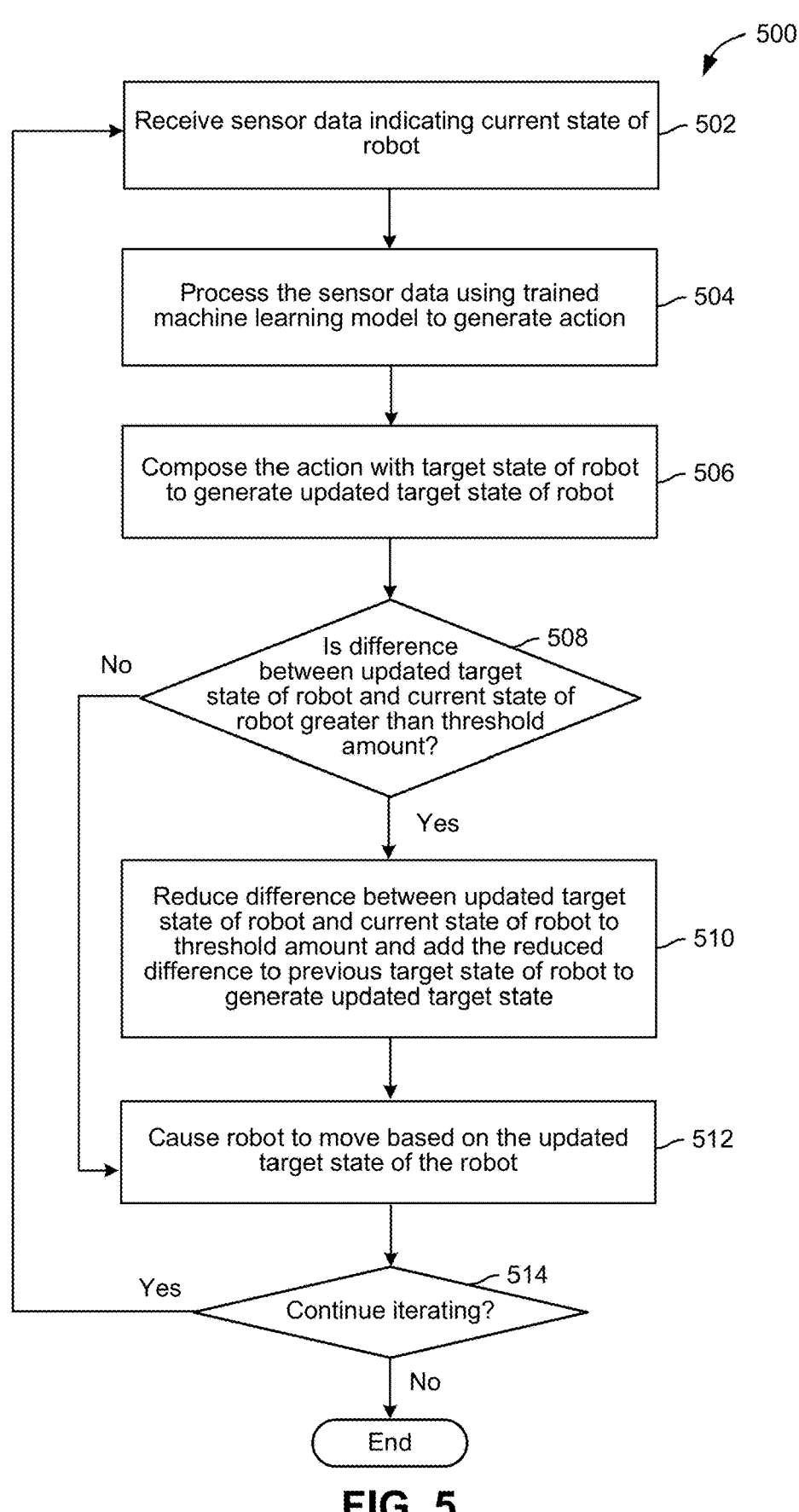
FIG. 5 is a flow diagram of method steps controlling a robot to perform a task in a real-world environment using a trained machine learning model, according to various embodiments.

FIG. 5 is a flow diagram of method steps controlling a robot to perform a task in a real-world environment using a trained machine learning model, according to various embodiments. Although the method steps are described in conjunction with the systems of FIGS. 1-3, persons skilled in the art will understand that any system configured to perform the method steps in any order falls within the scope of the present embodiments.

As shown, a method 500 begins at step 502, where the robot control application 146 receives sensor data indicating a current state of a robot. As described, in some embodiments, the sensor data can include proprioception data indicating the current angles of joints of the robot, such as robot joint encoder readings.

At step 504, the robot control application 146 processes the sensor data using a trained machine learning model to generate an action. In some embodiments, the trained machine learning model can be trained in any technically feasible manner, such as using reinforcement learning and training data that is generated via simulations of the robot performing a task in a virtual environment, using supervised learning and human demonstrations of controlling the robot to perform a task, etc. Further, the machine learning model can be trained to take as input sensor data and output any suitable action, such as a pose change (i.e., a delta pose that includes a position increment and an orientation increment) of an end effector of the robot, a change in a robot joint space, a change in a learned space, etc.

At step 506, the robot control application 146 composes the action with a target state of the robot to generate an updated target state of the robot. In some embodiments, the target state is the sum of an initial state of the robot and an accumulation of actions generated at different time steps during control of the robot. The action generated at step 504 is also accumulated by adding that action to the target state at step 506.

At step 508, the robot control application 146 determines whether a difference between the updated target state of the robot and the current state of the robot is greater than a threshold amount. If the robot control application 146 determines at step 508 that the difference between the updated target state of the robot and the current state of the robot is greater than the threshold amount, then at step 510, the robot control application 146 reduces the difference between the target state of the robot and the current state of the robot to the threshold amount and adds the reduced difference to a previous target state to generate a new updated target state. In some embodiments, the robot control application 146 separately reduces the components of the difference between the target state of the robot and the current state of the robot along each axis to a threshold amount if the difference is greater than the threshold amount for that axis.

At step 512, the robot control application 146 causes the robot to move based on the updated target state of the robot. In some embodiments, the robot control application 146 transmits a signal indicating the updated target state to a robot controller that converts the target state into joint torques and causes joints of the robot to rotate based on the joint torques. For example, in some embodiments, the robot controller can be a task space impedance controller, such as a PD controller.

At step 514, the robot control application 146 determines whether to continue iterating. If the robot control application 146 determines to stop iterating, such as if a task being performed by the robot has been completed, then the method 500 ends. On the other hand, if the robot control application 146 determines to continue iterating, then the method 500 returns to step 502, where the robot control application 146 receives additional sensor data indicating a current state of the robot.

In sum, techniques are disclosed for controlling a robot using a trained machine learning model. In some embodiments, a robot control application receives sensor data that indicates a current state of the robot. The robot control application inputs the sensor data into a trained machine learning model that generates an action. The robot control application adds the action to a target state of the robot, which is computed as the sum of an initial state of the robot and actions generated at each time step when the robot is being controlled. Then, the robot control application determines whether a difference between the target state of the robot and the current state of the robot is greater than a threshold amount. If the difference between the target state of the robot and the current state of the robot is greater than the threshold amount, then the robot control application clamps the difference between the target state of the robot and the current state of the robot to the threshold amount and generates a new target state by adding the clamped difference to the previous target state. Thereafter, the robot control application causes the robot to move based on the target state.

At least one technical advantage of the disclosed techniques relative to the prior art is that the disclosed techniques permit physical robots to be more effectively controlled using trained machine learning models than what can be achieved using prior art approaches. With the disclosed techniques, a physical robot can be controlled using a trained machine learning model to correctly perform a task in a real-world environment, even if the machine learning model was trained using simulations that do not accurately account for all of the physical phenomena in the real-world environment. These technical advantages represent one or more technological improvements over prior art approaches.

1. In some embodiments, a computer-implemented method for controlling a robot comprises receiving first sensor data indicating a first state of the robot, generating a first action based on the first sensor data and a trained machine learning model, computing a target state of the robot based on the first action and a previous target state of the robot, and causing the robot to move based on the target state of the robot.

2. The computer-implemented method of clause 1, wherein the target state of the robot is computed as a sum of the first action, one or more previously generated actions, and an initial state of the robot.

3. The computer-implemented method of clauses 1 or 2, further comprising determining that the difference between the target state of the robot and the first state of the robot along at least one axis is greater than a threshold value, and, in response, reducing the difference between the target state of the robot and the first state of the robot along the at least one axis to the threshold value.

4. The computer-implemented method of any of clauses 1-3, wherein the first action comprises at least one of a pose change of an end effector of the robot, a change in a robot joint space, or a change in a learned space.

5. The computer-implemented method of any of clauses 1-4, wherein causing the robot to move comprises transmitting, to a task space impedance controller, a control signal that indicates the target state of the robot.

6. The computer-implemented method of any of clauses 1-5, wherein causing the robot to move comprises computing one or more joint torques that are applied to one or more joints of the robot based on the target state of the robot.

7. The computer-implemented method of any of clauses 1-6, wherein the first sensor data includes proprioception data associated with one or more joints of the robot.

8. The computer-implemented method of any of clauses 1-7, wherein the first state of the robot comprises a current state of the robot.

9. The computer-implemented method of any of clauses 1-8, further comprising receiving second sensor data indicating a second state of the robot, generating a second action based on the second sensor data and the trained machine learning model, updating the target state of the robot based on the second action to generate an updated target state, and causing the robot to move based on the updated target state of the robot.

10. The computer-implemented method of any of clauses 1-9, wherein the trained machine learning model is trained using training data that is generated via one or more simulations of the robot within one or more virtual environments.

11. In some embodiments, one or more non-transitory computer-readable media store instructions that, when executed by at least one processor, cause the at least one processor to perform the steps of receiving first sensor data indicating a first state of the robot, generating a first action based on the first sensor data and a trained machine learning model, computing a target state of the robot based on the first action and a previous target state of the robot, and causing the robot to move based on the target state of the robot.

12. The one or more non-transitory computer-readable media of clause 11, wherein the target state of the robot is computed as a sum of the first action, one or more previously generated actions, and an initial state of the robot.

13. The one or more non-transitory computer-readable media of clauses 11 or 12, wherein the instructions, when executed by the at least one processor, further cause the at least one processor to perform the step of, determining that the difference between the target state of the robot and the first state of the robot along at least one axis is greater than a threshold value, and, in response, reducing the difference between the target state of the robot and the first state of the robot along the at least one axis to the threshold value.

14. The one or more non-transitory computer-readable media of any of clauses 11-13, wherein causing the robot to move comprises transmitting, to a proportional derivative controller, a control signal that indicates the target state of the robot.

15. The one or more non-transitory computer-readable media of any of clauses 11-14, wherein the sensor data includes data indicating one or more torques at one or more joints of the robot.

16. The one or more non-transitory computer-readable media of any of clauses 11-15, wherein the trained machine learning model is trained using training data that is generated via one or more simulations of the robot within one or more virtual environments.

17. The one or more non-transitory computer-readable media of any of clauses 11-16, wherein the trained machine learning model is trained using training data that is generated via one or more human demonstrations of controlling the robot to perform a task.

18. The one or more non-transitory computer-readable media of any of clauses 11-17, wherein the trained machine learning model is trained using at least one of a reinforcement learning technique or a supervised learning technique.

19. The one or more non-transitory computer-readable media of any of clauses 11-18, wherein the causing the robot to move comprises causing the robot to follow the target state of the robot.

20. In some embodiments, a system comprises one or more memories storing instructions, and one or more processors that are coupled to the one or more memories and, when executing the instructions, are configured to receive sensor data indicating a first state of a robot, generate an action based on the sensor data and a trained machine learning model, compute a target state of the robot based on the action and one or more previously generated actions, and cause the robot to move based on the target state of the robot.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for controlling a robot, the method comprising:
   receiving first sensor data indicating a current state of the robot;
   generating a first action based on the first sensor data and a trained machine learning model;
   computing a target state of the robot by adding the first action to a previous target state of the robot, wherein the previous target state of the robot is different from the current state of the robot;
   determining that a difference between the target state of the robot and the current state of the robot is greater than a threshold value;
   generating a clamped difference by clamping the difference to the threshold value;
   regenerating the target state of the robot by adding the clamped difference to the previous target state of the robot; and causing the robot to move based on the target state of the robot.

2. The computer-implemented method of claim 1, wherein the target state of the robot is computed as a sum of the first action, one or more previously generated actions, and an initial state of the robot.

3. The computer-implemented method of claim 1, wherein the first action comprises at least one of a pose change of an end effector of the robot, a change in a robot joint space, or a change in a learned space.

4. The computer-implemented method of claim 1, wherein causing the robot to move comprises transmitting, to a task space impedance controller, a control signal that indicates the target state of the robot.

5. The computer-implemented method of claim 1, wherein causing the robot to move comprises computing one or more joint torques that are applied to one or more joints of the robot based on the target state of the robot.

6. The computer-implemented method of claim 1, wherein the first sensor data includes proprioception data associated with one or more joints of the robot.

7. The computer-implemented method of claim 1, further comprising:

receiving second sensor data indicating a second state of the robot;

generating a second action based on the second sensor data and the trained machine learning model;

updating the target state of the robot based on the second action to generate an updated target state; and causing the robot to move based on the updated target state of the robot.

8. The computer-implemented method of claim 1, wherein the trained machine learning model is trained using training data that is generated via one or more simulations of the robot within one or more virtual environments.

9. One or more non-transitory computer-readable media storing instructions that, when executed by at least one processor, cause the at least one processor to perform the steps of:

receiving first sensor data indicating a current state of a robot;

generating a first action based on the first sensor data and a trained machine learning model;

computing a target state of the robot by adding the first action to a previous target state of the robot, wherein the previous target state of the robot is different from the current state of the robot;

determining that a difference between the target state of the robot and the current state of the robot is greater than a threshold value;

generating a clamped difference by clamping the difference to the threshold value;

regenerating the target state of the robot by adding the clamped difference to the previous target state of the robot; and causing the robot to move based on the target state of the robot.

10. The one or more non-transitory computer-readable media of claim 9, wherein the target state of the robot is computed as a sum of the first action, one or more previously generated actions, and an initial state of the robot.

11. The one or more non-transitory computer-readable media of claim 9, wherein causing the robot to move comprises transmitting, to a proportional derivative controller, a control signal that indicates the target state of the robot.

12. The one or more non-transitory computer-readable media of claim 9, wherein the first sensor data includes data indicating one or more torques at one or more joints of the robot.

13. The one or more non-transitory computer-readable media of claim 9, wherein the trained machine learning model is trained using training data that is generated via one or more simulations of the robot within one or more virtual environments.

14. The one or more non-transitory computer-readable media of claim 9, wherein the trained machine learning model is trained using training data that is generated via one or more human demonstrations of controlling the robot to perform a task.

15. The one or more non-transitory computer-readable media of claim 9, wherein the trained machine learning model is trained using at least one of a reinforcement learning technique or a supervised learning technique.

16. The one or more non-transitory computer-readable media of claim 9, wherein the causing the robot to move comprises causing the robot to follow the target state of the robot.

17. A system, comprising:

one or more memories storing instructions; and one or more processors that are coupled to the one or more memories and, when executing the instructions, are configured to:

receive sensor data indicating a current state of a robot, generate an action based on the sensor data and a trained machine learning model, compute a target state of the robot by adding the action to a previous target state of the robot, wherein the previous target state of the robot is different from the current state of the robot, determining that a difference between the target state of the robot and the current state of the robot is greater than a threshold value, generating a clamped difference by clamping the difference to the threshold value, regenerating the target state of the robot by adding the clamped difference to the previous target state of the robot, and cause the robot to move based on the target state of the robot.

* * * * *